United States Patent
Hedayat

(10) Patent No.: US 9,877,323 B1
(45) Date of Patent: Jan. 23, 2018

(54) OFDMA MAPPING FOR CLIENTS WITH VARIOUS BANDWIDTHS

(71) Applicant: NEWRACOM, INC., Irvine, CA (US)

(72) Inventor: Ahmad Reza Hedayat, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 136 days.

(21) Appl. No.: 14/918,414

(22) Filed: Oct. 20, 2015

Related U.S. Application Data

(60) Provisional application No. 62/069,683, filed on Oct. 28, 2014, provisional application No. 62/192,329, filed on Jul. 14, 2015, provisional application No. 62/200,600, filed on Aug. 3, 2015.

(51) Int. Cl.
*H04W 72/04* (2009.01)
*H04L 5/00* (2006.01)

(52) U.S. Cl.
CPC ....... *H04W 72/0446* (2013.01); *H04L 5/0007* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2011/0014922 A1* | 1/2011 | Jen | .................. | H04W 74/002 455/450 |
| 2011/0267993 A1* | 11/2011 | Seo | .................. | H04B 7/2656 370/279 |
| 2014/0105150 A1* | 4/2014 | Kim | .................. | H04B 7/0417 370/329 |
| 2015/0256403 A1* | 9/2015 | Li | .................. | H04W 72/048 370/235 |
| 2015/0271790 A1* | 9/2015 | Lee | .................. | H04W 48/16 455/450 |
| 2015/0365923 A1* | 12/2015 | Vermani | .................. | H04W 72/042 370/329 |
| 2016/0227572 A1* | 8/2016 | Li | .................. | H04W 72/1289 |
| 2017/0214561 A1* | 7/2017 | Lee | .................. | H04L 27/263 |
| 2017/0223665 A1* | 8/2017 | Chun | .................. | H04W 72/005 370/329 |

* cited by examiner

*Primary Examiner* — Charles C Jiang
*Assistant Examiner* — George Atkins, Jr.

(57) ABSTRACT

A method for communicating a signaling field in a wireless communications system comprises transmitting, by a wireless device, a frame through a medium. Transmitting the frame includes transmitting a first portion of a signaling field in the frame using a first channel and transmitting a second portion of the signaling field in the frame using a second channel. The first channel includes a first frequency and the second channel includes a second frequency different from the first frequency. Contents of the first portion are different from contents of the second portion. In an embodiment, transmitting the frame further includes transmitting a third portion of the signaling field using a third channel. The third channel includes a third frequency different from the first and second frequencies. Contents of the third portion are different from the contents of each of the first and second portions.

13 Claims, 5 Drawing Sheets

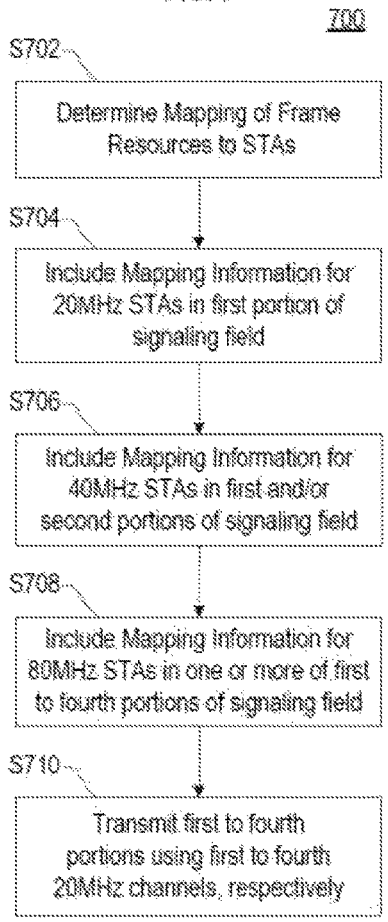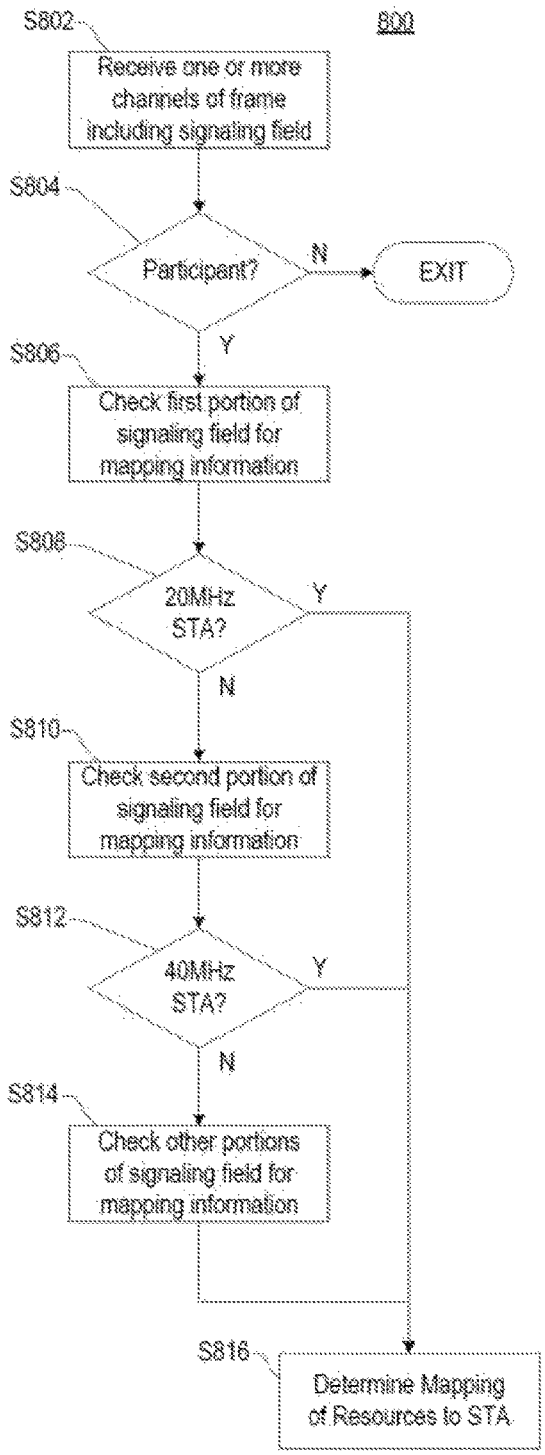

OFDMA MAPPING FOR CLIENTS WITH VARIOUS BANDWIDTHS

CROSS-REFERENCE TO RELATED APPLICATION

This application claims the benefit of U.S. Provisional Application No. 62/069,683, filed on Oct. 28, 2014, U.S. Provisional Application No. 62/192,329, filed on Jul. 14, 2015, and U.S. Provisional Application No. 62/200,600, filed on Aug. 3, 2015, the entire contents of each of which are incorporated herein by reference.

BACKGROUND

1. Technical Field

The technology described herein relates generally to wireless networking. More particularly, the technology relates to transmitting signaling information to a plurality of stations (STAs) in a Wireless Local Area Network (WLAN) wherein one or more STAs may utilize different bandwidths.

2. Description of the Related Art

Wireless LAN (WLAN) devices are currently being deployed in diverse environments. Some of these environments have large numbers of access points (APs) and non-AP stations in geographically limited areas. In addition, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

A WLAN is being standardized by the IEEE (Institute of Electrical and Electronics Engineers) Part 11 under the name of "Wireless LAN Medium Access Control (MAC) and Physical Layer (PHY) Specifications." A series of standards have been adopted as the WLAN evolved, including IEEE Std 802.11™-2012 (March 2012) (hereinafter, IEEE Std 802.11). The IEEE Std 802.11 was subsequently amended by IEEE Std 802.11ae™-2012, IEEE Std 802.11aa™-2012, IEEE Std 802.11ad™-2012, and IEEE Std 802.11ac™-2013 (hereinafter, IEEE 802.11ac).

Recently, an amendment focused on providing a high efficiency WLAN in high-density scenarios is being developed by the IEEE 802.11ax task group. The 802.11.ax amendment focuses on improving metrics that reflect user experience, such as average per station throughput, the 5th percentile of per station throughput of a group of stations, and area throughput. Improvements will be made to support environments such as wireless corporate offices, outdoor hotspots, dense residential apartments, and stadiums.

New multiuser transmission technologies such as Multi-User (MU) Multiple-input Multiple-output (MIMO) and MU Orthogonal Frequency-Division Multiple Access (OFDMA), have received much interest for next-generation Wi-Fi technology. Particularly, OFDMA technology has potential since it does not require an antenna array at an AP.

In OFDMA, several OFDM symbols are sent consecutively at each of a plurality of frequencies. Hence, OFDMA has a frequency or subcarrier dimension and a time, or OFDM symbol index, dimension. Thus, OFDMA uses two-dimensional (2D) time-frequency resources, and a subset of the 2D resources are assigned for unicasting a packet to or from a client. Simultaneously communicating with a plurality of client, such as by using a Down-Link (DL) or Up-Link (UL) OFDMA frame, may improve a medium utilization efficiency of the WLAN STAs within a WLAN may be configured to use different bandwidths. For example, a STA capable of using an 80 MHz bandwidth may from time to time be configured to utilize only a 20 MHz or 40 MHz bandwidth for transmission and/or reception to save power.

Communicating with as many STA as possible using a single frame may increase the medium utilization efficiency of the WLAN. For example, aggregating frames for as many STA as possible into a single OFDMA frame may increase the medium utilization efficiency, and may relax a scheduling burden of the AP. In another example, sending signaling information, such as a resource allocation map allocating resources of an OFDMA frame to a plurality of STA, to the plurality of STA using a single OFDMA frame may increase the medium utilization efficiency.

The number of STA that may be communicated with using a single frame may be increased when the single frame supports simultaneous communication with STAs that are contemporaneously configured to utilize different bandwidths from each other.

SUMMARY

In an embodiment, a method for communicating a signaling field in a wireless communications system comprises transmitting, by a wireless device, a frame through a medium. Transmitting the frame includes transmitting a first portion of a signaling field in the frame using a first channel and transmitting a second portion of the signaling field in the frame using a second channel. The first channel includes a first frequency and the second channel includes a second frequency different from the first frequency. Contents of the first portion are different from contents of the second portion.

In an embodiment, the signaling field is one of (1) a High Efficiency (HE) Signal-B (SIG-B) field and (2) one or more payload fields of a downlink frame that triggers immediate subsequent uplink communications.

In an embodiment, the first and second channels have a same bandwidth.

In an embodiment, each of the first and second channels has a 20 MHz bandwidth or a 40 MHz bandwidth.

In an embodiment, transmitting the frame further includes transmitting a third portion of the signaling field using a third channel. The third channel includes a third frequency different from the first and second frequencies. Contents of the third portion are different from the contents of each of the first and second portions.

In an embodiment, transmitting the frame further includes transmitting a fourth portion of the signaling field using a fourth channel. The fourth channel includes a fourth frequency different from the first, second and third frequencies. Contents of the fourth portion are different from the contents of each of the first, second, and third portions.

In another embodiment, transmitting the frame further includes transmitting a fourth portion of the signaling field using a fourth channel. The fourth channel includes a fourth frequency different from the first, second and third frequencies. Contents of the fourth portion have a polynomial relationship with the contents of one or more of the first, second, and third portions.

In an embodiment, transmitting the frame further includes, transmitting the first portion of the signaling field using a third channel. The third channel includes a third frequency different from the first and second frequencies.

In an embodiment, the method further includes determining, by the wireless device, a plurality of assignments of resources of a mapped frame to respective stations of a plurality of stations, determining, by the wireless device, respective operational bandwidths of the plurality of stations, and incorporating, by the wireless device, the assignments into the contents of either the first or second portion according to the operational bandwidths of the respective stations.

In an embodiment, incorporating the assignments into the contents of either the first or second portions according to the operational bandwidths of the respective stations includes incorporating an assignment into the first portion when a respective station has an operational bandwidth equal to a bandwidth of the first channel, incorporating the assignment into the second portion when the respective station has the operational bandwidth equal to a sum of the bandwidth of the first channel and a bandwidth of the second channel.

In an embodiment, the method further includes incorporating the assignment into a third portion of the signaling field when the respective station has the operational bandwidth equal to or greater than a sum of the bandwidth of the first channel, the bandwidth of the second channel, and a bandwidth of a third channel, and transmitting the third portion of the signaling field using the third channel. The third channel includes a third frequency different from the first and second frequencies.

In an embodiment, wherein incorporating the assignments into the contents of either the first or second portions according to the operational bandwidths of the respective stations further includes incorporating the assignment into the first and second portions when the respective station has the operational bandwidth equal to the sum of the bandwidth of the first channel and a bandwidth of the second channel.

In an embodiment, the frame is the mapped frame.

In an embodiment, the frame precedes the mapped frame.

In an embodiment, the mapped frame is an Up-Link (UL) Orthogonal Multi-Frequency Multiple Access (OFDMA) frame.

In an embodiment, the method further comprises transmitting, by the wireless device, a duplication indication. The contents of the first portion of the signaling field are equal to the contents of the second portion when the duplication indication has a first value, and the contents of the first portion of the signaling field are different from the contents of the second portion when the duplication indication has a second value.

In an embodiment, one or more of the frame, a Beacon frame transmitted by the wireless device, and an Association Response frame transmitted by the wireless device includes the duplication indication.

In an embodiment, a method for communicating a signaling field in a wireless communications system comprises processing, by a wireless device, first contents of a first channel of a frame received through a medium, processing, by the wireless device, second contents of a second channel of the frame when an operational bandwidth of the wireless device is equal to or greater than a first bandwidth value, determining contents of the signaling field according to the first contents when the operational bandwidth is less than the first bandwidth value, and determining the contents of the signaling field according to the first and second contents when the operational bandwidth is equal to or greater than the first bandwidth value.

In an embodiment, the method further comprises processing, by the wireless device, third contents of a third channel of the frame when the operational bandwidth of the wireless device is equal to or greater than a second bandwidth value, and determining the contents of the signaling field according to the first, second, and third contents when the operational bandwidth is equal to or greater than the second bandwidth value. The second bandwidth value is larger than the first bandwidth value.

In an embodiment, the signaling field includes mapping information of a mapped frame.

BRIEF DESCRIPTION OF THE DRAWINGS

FIG. 7 illustrates a process for communicating mapping information according to an embodiment.

FIG. 8 illustrates a process of determining mapping information according to an embodiment.

DETAILED DESCRIPTION

Figure 1:
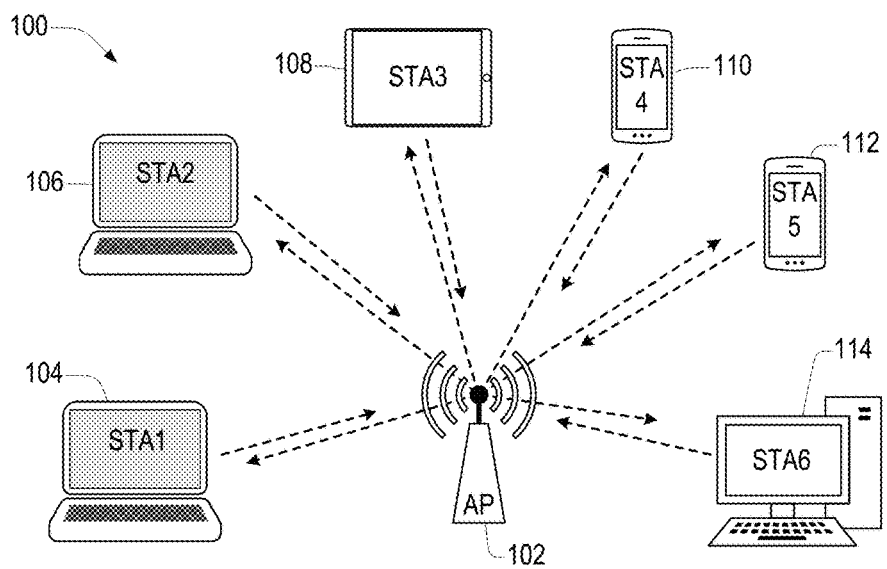
FIG. 1 illustrates a wireless network according to an embodiment.

Embodiments of the present disclosure relate generally to wireless networking, and more particularly, to simultaneous communication of signaling information to stations using different bandwidths.

In the following detailed description, certain illustrative embodiments have been illustrated and described. As those skilled in the art would realize, these embodiments may be modified in various different ways without departing from the scope of the present disclosure. Accordingly, the drawings and description are to be regarded as illustrative in nature and not restrictive. Like reference numerals designate like elements in the specification.

FIG. 1 illustrates a wireless network according to an embodiment. The wireless network includes an infrastructure Basic Service Set (BSS) 100 of a Wireless Local Area Network (WLAN). In an IEEE 802.11 wireless LAN, the BSS provides the basic building-block and may include an access point (AP) and one or more associated stations (STAs). In FIG. 1, the BSS 100 includes an Access Point 102 wirelessly communicating with a plurality of wireless devices (or stations) 104 to 114 (also referred to as AP and STA1 to STA6). The wireless devices may include a medium access control layer (MAC) and a physical layer (PHY) according to an IEEE 802.11 standard and/or according to the techniques and mechanism discussed herein.

The AP 102 is a station, that is, a STA, configured to control and coordinate functions of the BSS 100. The AP 102 may transmit information to a single station selected from the plurality of stations STA1 to STA6 in the BSS 100 using a single frame, or may simultaneously transmit information to two or more (e.g., to all six) stations STA1 to STA6 in the BSS 100 using either a single Orthogonal Frequency Division Multiplexing (OFDM) broadcast frame, a single OFDM Multi-User Multi-Input-Multi-Output (MU-MIMO) transmission, or a single Orthogonal Frequency Division Multiple Access (OFDMA) frame.

The stations STA1 to STA6 may transmit data to the AP 102 using a single frame, or transmit information to and receive information from another one of the stations STA1 to STA6 using a single frame.

In another embodiment, the AP 102 may be absent and the stations STA1 to STA6 may be in an ad-hoc network.

Each of the stations STA1 to STA6 and the AP 102 includes a processor and a transceiver, and may further include a user interface and a display device. The processor is configured to generate a frame to be transmitted through a wireless network, to process a frame received through the wireless network, and to execute protocols of the wireless network. The processor may perform some or all of its functions by executing computer programming instructions stored on a non-transitory computer-readable medium. The transceiver represents a unit functionally connected to the processor, and designed to transmit and receive a frame through the wireless network. The transceiver may be defined using a single component that performs the functions of transmitting and receiving, or two separate components each performing one of such functions. The processor and the transceiver may be implemented by hardware components and/or software components integrated within the respective STA1 to STA6 and/or the AP 102.

AP 102 may be or may include a WLAN router, a stand-alone Access Point, a WLAN bridge, a Light-Weight Access Point (LWAP) managed by a WLAN controller, and the like. In addition, a device such as a personal computer, tablet computer, or cellular phone may be able to operate as the AP 102, such as when a cellular phone is configured to operate as a wireless "hot spot."

Each of STA1 to STA6 may be or may include a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, a digital video player, and the like.

The present disclosure may be applied to WLAN systems according to IEEE 802.11 standards but is not limited thereto.

In IEEE 802.11 standards, frames exchanged between stations (including access points) are classified into management frames, control frames, and data frames. A management frame may be a frame used for exchanging management information that is not forwarded to a higher layer of a communication protocol stack. A control frame may be a frame used for controlling access to a medium. A data frame may be a frame used for transmitting data to be forwarded to the higher layer of the communication protocol stack.

Each frame's type and subtype may be identified using a type field and a subtype field included in a control field of the MAC header of the frame, as prescribed in the applicable standard.

Figure 2:
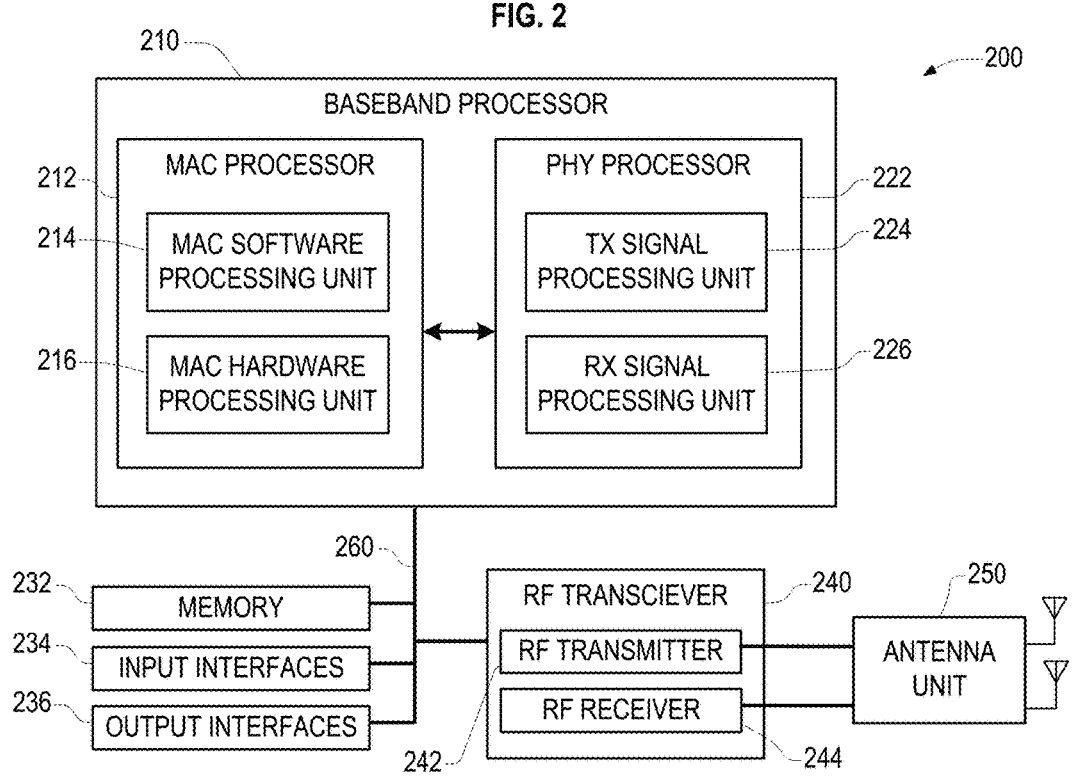
FIG. 2 illustrates a schematic block diagram of a wireless device according to an embodiment.

FIG. 2 illustrates a schematic block diagram of a wireless device 200 according to an embodiment. The wireless or WLAN device 200 can represent any device in a BSS, e.g., AP 102 or any of stations 104 to 114 in FIG. 1. The WLAN device 200 includes a baseband processor 210, a radio frequency (RF) transceiver 240, an antenna unit 250, a storage device (e.g., memory) 232, one or more input interfaces 234, and one or more output interfaces 236. The baseband processor 210, the memory 232, the input interfaces 234, the output interfaces 236, and the RF transceiver 240 may communicate with each other via a bus 260.

The baseband processor 210 performs baseband signal processing, and includes a MAC processor 212 and a PHY processor 222. The baseband processor 210 may utilize the storage device 232, which may include a non-transitory computer readable medium having software (e.g., computer programming instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware, hereinafter referred to as "MAC hardware." However, the MAC processor 212 is not limited thereto. For example, the MAC processor 212 may be configured to perform the first and second plurality of functions entirely in software or entirely in hardware according to an implementation.

The PHY processor 222 includes a transmitting signal processing unit 224 and a receiving signal processing unit 226. The PHY processor 222 implement a plurality of functions of the PHY layer. These functions may be performed in software, hardware, or a combination thereof according to implementation.

The RF transceiver 240 includes an RF transmitter 242 and an RF receiver 244. The RF transceiver 240 is configured to transmit first information received from the baseband processor 210 to the WLAN, and provide second information received from the WLAN to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas.

The input interfaces 234 receive information from a user, and the output interfaces 236 output information to the user. The input interfaces 234 may include one or more of a keyboard, keypad, mouse, touchscreen, touch screen, microphone, and the like. The output interfaces 236 may include one or more of a display device, touch screen, speaker, and the like.

As described herein, many functions of the WLAN device 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the WLAN device 200. Furthermore, the WLAN device 200 may include other components, such as application processors, storage interfaces, clock generator circuits, power supply circuits, and the like, which have been omitted in the interest of brevity.

Figure 3:
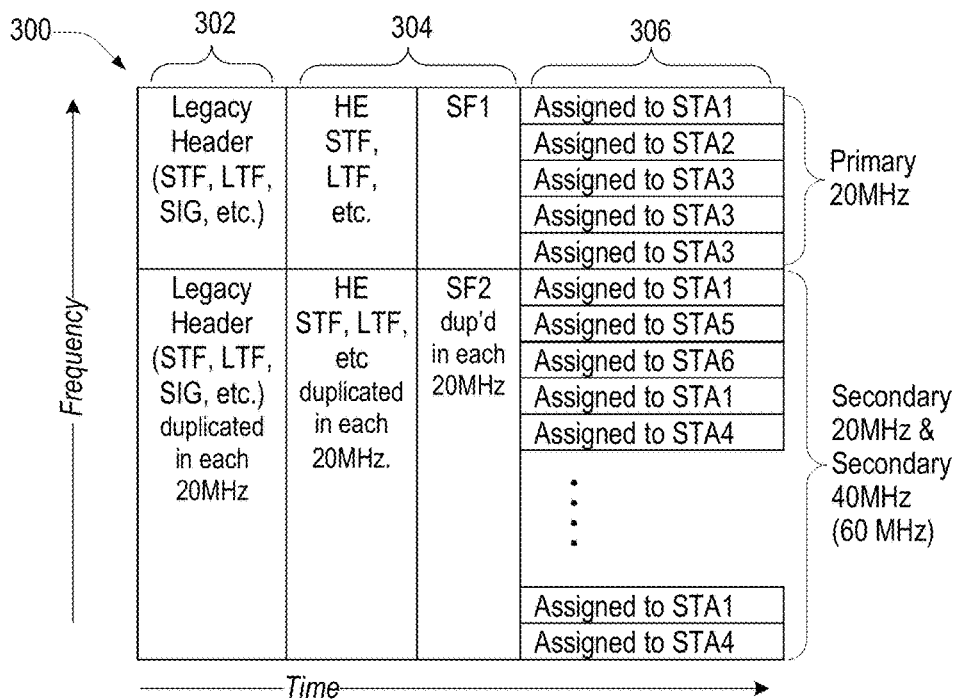
FIG. 3 illustrates an Orthogonal Frequency-Division Multiple Access (OFDMA) frame according to an embodiment.

FIG. 3 shows a single OFDMA frame 300 according to an embodiment. In an OFDMA frame, several OFDM symbols are sent consecutively using one or more subcarriers of a plurality of subcarriers. Therefore, an OFDMA frame has a first frequency or subcarrier dimension and a second time or OFDM symbol index dimension that define a set of two-dimensional (2D) time-frequency resources. In an OFDMA frame, a plurality of subsets of the 2D resource are respectively assigned for unicasting information to or from a plurality of clients.

The OFDMA frame 300 has an 80 MHz bandwidth that includes a Primary 20 MHz channel. The 80 MHz bandwidth also includes a Secondary 20 MHz channel and a Secondary 40 MHz channel, which together take up the remaining 60 MHz of bandwidth. The OFDMA frame 300 includes a legacy header portion (L-HDR) 302, a High Efficiency header portion (HE-HDR) 304, and a multi-access portion 306. In an embodiment, the OFDMA frame 300 is a Down-Link (DL) OFDMA frame.

When an AP uses a single OFDMA frame to communicate with a plurality of STAs configured with varying operational bandwidths (BWs), each of the STAs must have a proper understanding of all the pertinent portions of the OFDMA frame. For this reason, the L-HDR 302 includes a Legacy Long Training Field (L-LTF), a Legacy Short Training Field (L-STF), and a Legacy Signal Field (L-SIG) that are each transmitted using a 20 MHz BW and that are each duplicated across the entire BW of the OFDMA frame 300. Similarly, the HE-HDR 304 may include one or more of an HE-LTF field, an HE-STF field, an HE-SIG field, a Group Identifier (GID), and a Partial Association Identifier (PAID) that that are each transmitted using a 20 MHz BW and that are each duplicated across the entire BW of the OFDMA frame 300.

The multi-access portion 306 includes a plurality of sub-channels within each channel, and one or more of the sub-channels may be assigned to each of the STAs that will participate in communications by using the OFDMA frame 300.

In the example shown in FIG. 3, the OFDMA frame 300 includes data destined for first to sixth STAs STA1 to STA6. At the time the OFDMA frame 300 is transmitted, STA2 and STA3 are configured to operate with a 20 MHz BW (i.e., STA2 and STA3 have a 20 MHz operational bandwidth), and specifically in the primary 20 MHz channel. STA1, STA4, STA5, and STA6 are configured to have an 80 MHz operational BW at the time the OFDMA frame 300 is transmitted.

Accordingly, in the primary 20 MHz channel, a first sub-channel of the primary 20 MHz channel is assigned to STA1, a second sub-channel is assigned to STA2, and third to fifth sub-channels are assigned to STA3. In the remaining 60 MHz BW of the OFDMA frame 300 (comprised of the secondary 20 MHz channel and the secondary 40 MHz channel), FIG. 3 shows three additional sub-channels assigned to STA1, two sub-channels assigned to STA4, one sub-channel assigned to STA5, and one sub-channel assigned to STA6.

Additional sub-channels (not shown) in the area indicated by the ellipses in the multi-access portion 306 may be assigned to one or more of the STAs having the 80 MHz operational BW (i.e. STA1, STA4, STA5, and STA6). However, because STA2 and STA3 have the 20 MHz operational BW, no sub-channels in the area indicated by the ellipses are assigned to either of STA2 and STA3.

The HE-HDR 304 may include information on the mapping of the sub-channels of the multi-access portion 306 to stations. The stations receiving the OFDMA frame 300 must be able to receive and decode this mapping information. One solution is to place the mapping information in the 20 MHz primary channel and duplicate it on the other channels. However, this may require using a large number of OFDM symbols to communicate the mapping information, which would increase the length (along the time dimension) of the HE-HDR 304 and thereby reduce the medium utilization efficiency of the WLAN.

FIG. 3 illustrates the mapping information being communicated in the frame to which the mapped frame applies (that is, the frame that includes the resources being mapped) but embodiments are not limited thereto. In an embodiment, the mapping information may be included in a frame that precedes the mapped frame.

In an embodiment, the mapping information is disposed in two or three separate portions according to operational BWs of the STAs to which the mapping information applies. Each portion would include respective error detection information, or error correction information, or both, such as one or more of a Cyclic Redundancy Check (CRC), a Low Density Parity Code (LDPC), a Binary Convolution Code (BCC), and the like. In an embodiment, the number of portions that the mapping information is disposed in, the symbol-length (that is, the length in the time dimension) of a field including the mapping information, and a Modulation and Coding Scheme (MCS) of the field including the mapping information may be signaled in one or more HE Signal (HE-SIG) fields of the HE-HDR 304.

In the example shown in FIG. 3, the mapping information is split into two portions. A first portion of the mapping information includes all the mapping information for STAs having operational BWs of 20 MHz and operating in the primary 20 MHz channel. The first portion may be included in a first signaling field portion SF1 having a 20 MHz BW and transmitted in the primary 20 MHz channel. In an embodiment, the first portion of the mapping information may also include mapping information for STAs having operational BWs greater than 20 MHz that operate in at least the primary 20 MHz channel of the OFDMA frame 300.

A second portion of the mapping information includes mapping information for STAs having operational BWs of greater than 20 MHz. The second portion may be included in a second signaling field portion SF2 having a 20 MHz bandwidth. The second signaling field portion SF2 is transmitted on the secondary 20 MHz channel and duplicated on each 20 MHz of the secondary 40 MHz channel of the OFDMA frame 300.

Thus, in the particular instance shown in FIG. 3, the signaling field portion SF1 includes mapping information that indicates assignment for the STAs with 20 MHz operational BWs (STA2 and STA3) and possibly assignments for STAs with 80 MHz operational BWs (STA1), and the signaling field portion SF2 includes mapping information that shows assignments for STAs with 80 MHz operational BWs (STA1, STA4, STA5, and STAG).

The STAs with 20 MHz operational BWs that are indicated as being recipients of information in the OFDMA frame 300 only check the first signaling field portion SF1 for mapping information. The STAs with operational BWs of 40 MHz or more and that are indicated as being recipients of information in the OFDMA frame 300 may check one or both of the first and second signaling field portions SF1 and SF2 for mapping information. Indications of which STAs are recipients of information in the OFDMA frame 300 may be communicated in one or more HE-SIG fields in the HE-HDR 304.

In an embodiment, a STA with an operational BW of 40 MHz or more (a 40 MHz+ STA) that is indicated as being a recipient of information in the OFDMA frame 300 may first check the first signaling field portion SF1 for pertinent mapping information (that is, one or more assignments of frame resources to the 40 MHz+ STA), and if no assignment for the 40 MHz+ STA is included in the first signaling field portion SF1's mapping information, the STA may then check the second signaling field portion SF2. In another embodiment, the 40 MHz+ STA always checks both the first and second signaling field portions SF1 and SF2 for pertinent mapping information.

Figure 4:
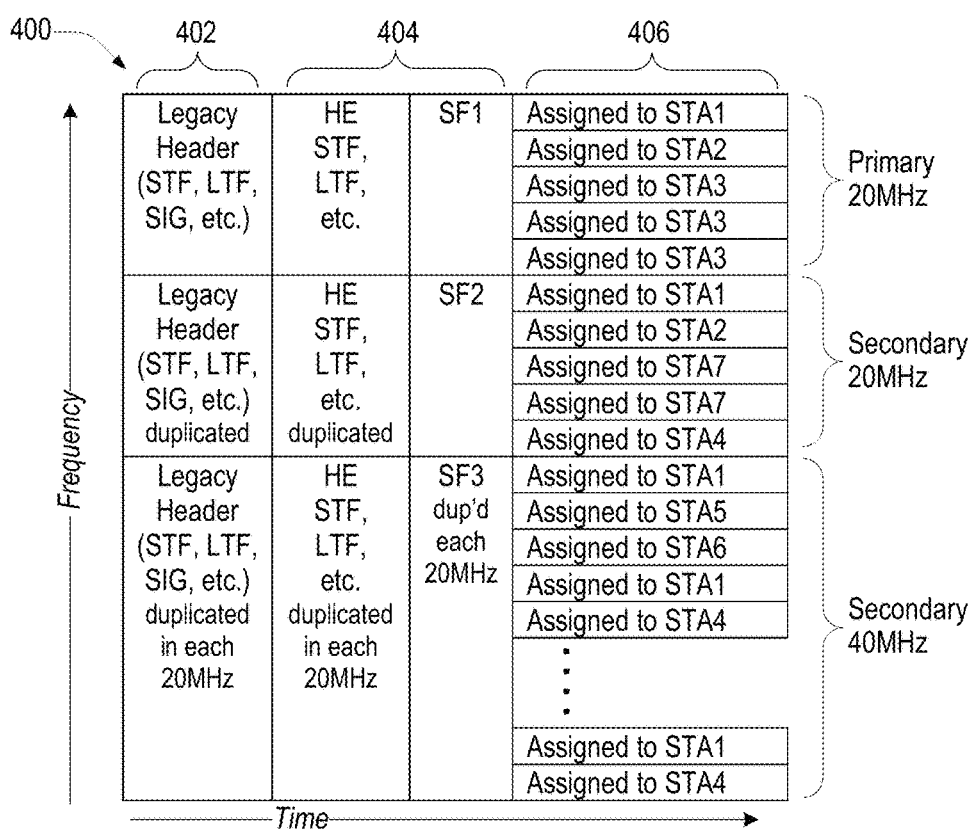
FIG. 4 illustrates an OFDMA frame for communicating with STAs having operational bandwidths (BWs) of 20 MHz, 40 MHz, and 80 MHz according to an embodiment.

FIG. 4 illustrates an OFDMA frame 400 for communicating with STAs having respective operational BWs of 20 MHz, 40 MHz, and 80 MHz according to an embodiment.

The OFDMA frame 400 has an 80 MHz bandwidth that includes a primary 20 MHz channel, a secondary 20 MHz channel, and a secondary 40 MHz channel. The OFDMA frame 400 includes an L-HDR 402, an HE-HDR 404, and a multi-access portion 406. In an embodiment, the OFDMA frame 400 is a Down-Link (DL) OFDMA frame.

The L-HDR 402 includes a Legacy Long Training Field (L-LTF), a Legacy Short Training Field (L-STF), and a Legacy Signal Field (L-SIG) that are each transmitted using a 20 MHz BW and that are each duplicated across the entire BW of the OFDMA frame 400. The HE-HDR 404 may include one or more of an HE-LTF field, an HE-STF field, an HE-SIG field, a Group Identifier (GID), and a Partial Association Identifier (PAID) that are each transmitted using a 20 MHz BW and duplicated across the entire BW of the OFDMA frame 400.

The multi-access portion 406 includes a plurality of sub-channels within each channel, and one or more of the sub-channels may be assigned to each of the STAs that will participate in the communication using the OFDMA frame 400.

In the example shown in FIG. 4, the OFDMA frame 400 includes data destined for first to seventh STAs STA1 to STA7. At the time the OFDMA frame 400 is transmitted, STA3 is configured to have a 20 MHz operational BW including the primary 20 MHz channel, STA2 is configured to have a 40 MHz operational BW including the primary and secondary 20 MHz channels, and STA1, STA4, STA5, STA6, and STA7 are configured to have an 80 MHz operational BW including the entire bandwidth of the OFDMA frame 400.

In the primary 20 MHz channel, a first sub-channel is assigned to STA1, a second sub-channel is assigned to STA2, and third to fifth sub-channels are assigned to STA3. In the secondary 20 MHz channel, a first sub-channel is assigned to STA1, a second sub-channel is assigned to STA2, third and fourth fifth sub-channels are assigned to STA7, and a fifth sub-channel is assigned to STA4.

In the remaining 40 MHz BW of the OFDMA frame 400 (the secondary 40 MHz channel), FIG. 4 shows three additional sub-channels assigned to STA1, two additional sub-channels assigned to STA4, one sub-channel assigned to STA5, and one sub-channel assigned to STA6. Additional sub-channels (not shown) in the area indicated by the ellipses in the multi-access portion 406 may be assigned to one or more of the STAs having the 80 MHz operational BW (i.e. STA1, STA4, STA5, STA6, and STA7). However, because STA2 and STA3 have 40 MHz and 20 MHz operational BWs, respectively, no sub-channels in the area indicated by the ellipses are assigned to either of STA2 and STA3.

The HE-HDR 404 may include information on the mapping of the sub-channels of the multi-access portion 406 to stations. The stations receiving the OFDMA frame 400 must be able to receive and decode this mapping information.

In the example shown in FIG. 4, the mapping information is split into three portions, each portion including respective error detection information and/or error correction information. In an embodiment, the number of portions that the mapping information is disposed in, as well as the symbol-length (that is, the length on the time dimension) and Modulation and Coding Scheme (MCS) of a field including the mapping information, may be signaled in one or more HE Signal (HE-SIG) fields of the HE-HDR 404.

A first portion of the mapping information includes all the mapping information for STAs having operational BWs of 20 MHz and operating in the primary 20 MHz channel. The first portion may be included in a first signaling field portion SF1 having a 20 MHz BW and transmitted in the primary 20 MHz channel. In an embodiment, the first portion of the mapping information may also include mapping information for STAs having operational BWs greater than 20 MHz that operate in at least the primary 20 MHz channel of the OFDMA frame 400.

A second portion of the mapping information includes mapping information for STAs having operational BWs of 40 MHz. The second portion may be included in a second signaling field portion SF2 having a 20 MHz bandwidth. The second signaling field portion SF2 is transmitted on the secondary 20 MHz channel of the OFDMA frame 400. In an embodiment, the second portion of the mapping information may also include mapping information for STAs having operational BWs greater than 40 MHz that operate in at least the primary and secondary 20 MHz channel (i.e. the primary 40 MHz channel) of the OFDMA frame 400.

A third portion of the mapping information includes mapping information for STAs having operational BWs of 80 MHz. The third portion may be included in a third signaling field portion SF3 having a 20 MHz bandwidth. The third signaling field portion SF3 is transmitted on a first 20 MHz portion of the secondary 40 MHz channel of the OFDMA frame 400, and duplicated on a second 20 MHz portion of the secondary 40 MHz channel. In another embodiment, the third signaling field portion SF3 is transmitted on the secondary 40 MHz channel of the OFDMA frame 400.

Thus, in the example shown in FIG. 4, the signaling field portion SF1 includes mapping information that indicates assignments for the STAs with 20 MHz operational BWs (STA3) and that may also indicate assignments for one or more STAs with greater than 20 MHz operational BWs. The signaling field portion SF2 includes mapping information that indicates assignments for the STAs with 40 MHz operational BW (STA2) and that may also indicate assignments for one or more STAs with greater than 40 MHz operational BWs. The signaling field portion SF3 includes mapping information that shows assignments for STAs with 80 MHz operational BWs (STA1, STA4, STA5, STAG, and STAT).

STAs with 20 MHz operational BWs that are indicated as being recipients of information in the OFDMA frame 400 only check the first signaling field portion SF1 for mapping information. STAs with 40 MHz operational BWs that are indicated as being recipients of information in the OFDMA frame 400 may check one or both of the first and second signaling field portions SF1 and SF2 for mapping information. STAs with 80 MHz operational BWs that are indicated as being recipients of information in the OFDMA frame 400 may check any or all of the first, second, and third signaling field portions SF1, SF2, and SF3 for mapping information. Indications of which STAs are recipients of information in the OFDMA frame 400 may be communicated in one or more HE-SIG fields in the HE-HDR 404.

In an embodiment, a STA with an 80 MHz operational BW (an 80 MHz STA) that is indicated as being an recipient of information in the OFDMA frame 400 may first check the first signaling field portion SF1 for pertinent mapping information (that is, one or more assignments of frame resources to the 80 MHz STA). If no assignment for the 80 MHz STA is included in the first signaling field portion SF1's mapping information, the 80 MHz STA then checks the second signaling field portion SF2. In another embodiment, the 80 MHz STA always checks both of the first and second signaling field portions SF1 and SF2 for pertinent mapping information.

In an embodiment, the 80 MHz STA that is indicated as being a recipient of information in the OFDMA frame 400 may first check the first signaling field portion SF1 for pertinent mapping information, and if no assignment for the STA is included in the first signaling field portion SF1's mapping information, the 80 MHz STA then checks the second signaling field portion SF2. If no assignment for the 80 MHz STA is included in the second signaling field portion SF2's mapping information, the STA then check the third signaling field portion SF3. In another embodiment, the 80 MHz STA always checks all of the first, second, and third signaling field portions SF1, SF2, and SF3 for pertinent mapping information.

Figure 5:
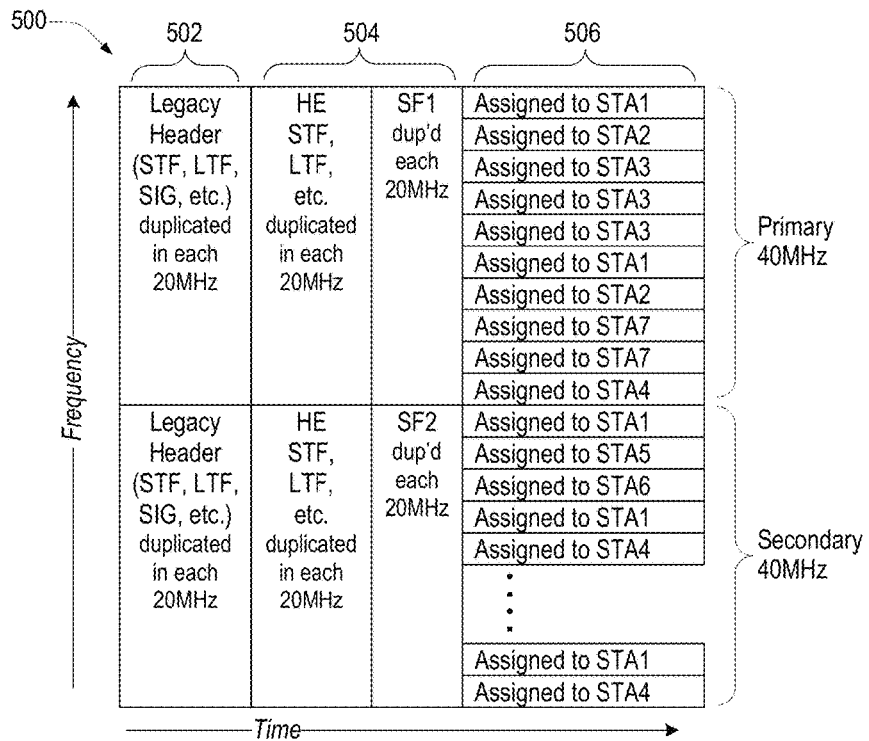
FIG. 5 illustrates an 80 MHz OFDMA frame for communicating with STAs having operational BWs of 40 MHz and 80 MHz according to an embodiment.

FIG. 5 illustrates an 80 MHz OFDMA frame 500 for communicating with STAs having respective operational BWs of 40 MHz and 80 MHz according to an embodiment. The OFDMA frame 400 has a 80 MHz bandwidth that includes a primary 40 MHz channel and a secondary 40 MHz channel. The OFDMA frame 500 includes an L-HDR 502, an HE-HDR 504, and a multi-access portion 506. In an embodiment, the OFDMA frame 500 is a Down-Link (DL) OFDMA frame.

The L-HDR 502 includes a Legacy Long Training Field (L-LTF), a Legacy Short Training Field (L-STF), and a Legacy Signal Field (L-SIG) that are each transmitted using a 20 MHz BW and that are each duplicated across the entire BW of the OFDMA frame 500. The HE-HDR 504 may include one or more of an HE-LTF field, an HE-STF field, an HE-SIG field, a Group Identifier (GID), and a Partial Association Identifier (PAID) that that are each transmitted using a 20 MHz BW and that are each duplicated across the entire BW of the OFDMA frame 500.

The multi-access portion 506 includes a plurality of sub-channels within each channel, and one or more of the sub-channels may be assigned to each of the STAs that will participate in the communication using the OFDMA frame 500.

In the example shown in FIG. 5, the OFDMA frame 500 includes data destined for first to seventh STAs STA1 to STA7. At the time the OFDMA frame 500 is transmitted, STA2 and STA3 are configured to have 40 MHz operational BWs including the primary 40 MHz channel, and STA1, STA4, STA5, STA6, and STA7 are configured to have 80 MHz operational BWs including the entire bandwidth of the OFDMA frame 500.

In the primary 40 MHz channel, one or more sub-channels are assigned to each of STA1, STA2, STA3, and STA7. In the secondary 40 MHz channel, one or more sub-channels are assigned to each of STA1, STA4, STA5, and STA6. Additional sub-channels (not shown) in the area indicated by the ellipses in the multi-access portion 506 may be assigned to one or more of the STAs having the 80 MHz operational BW (i.e. STA1, STA4, STA5, STAG, and STAT). However, because STA2 and STA3 each have a 40 MHz operational BW, no sub-channels in the area indicated by the ellipses are assigned to either of STA2 and STA3.

The HE-HDR 504 may include information on the mapping of the sub-channels of the multi-access portion 506 to stations. The stations that participate in the communication using the OFDMA frame 500 must be able to receive and decode this mapping information.

In the example shown in FIG. 5, the mapping information is split into two portions, each portion including respective error detection information and/or error correction information. In an embodiment, one or more of a number of portions that the mapping information is disposed in, a symbol-length (that is, a length on the time dimension) of the mapping information, and a Modulation and Coding Scheme (MCS) of the mapping information may be signaled in one or more of HE Signal (HE-SIG) fields in the HE-HDR 504.

A first portion of the mapping information includes all the mapping information for STAs having operational BWs of 40 MHz and operating in the primary 40 MHz channel. The first portion may be included in a first signaling field portion SF1 having a 20 MHz BW. The first signaling field portion SF1 is transmitted in a first 20 MHz portion of the primary 40 MHz channel and duplicated in a second 20 MHz portion of the primary 40 MHz channel. In an embodiment, the first portion of the mapping information may also include mapping information for STAs having operational BWs greater than 40 MHz that operate in at least the primary 40 MHz channel. In another embodiment, the first signaling field portion SF1 is transmitted in the primary 40 MHz channel.

A second portion of the mapping information includes mapping information for STAs having operational BWs of 80 MHz. The second portion may be included in a second signaling field portion SF2 having a 20 MHz bandwidth. The second signaling field portion SF2 is transmitted in a first 20 MHz portion of the secondary 40 MHz channel of the OFDMA frame 500 and duplicated in a second 20 MHz portion of the secondary 40 MHz channel. In another embodiment, the second signaling field portion SF2 is transmitted in the primary 40 MHz channel.

Thus, in the particular example shown in FIG. 5, signaling field portion SF1 includes mapping information that indicates assignments for the STAs with 40 MHz operational BWs (STA2 and STA3), and signaling field portion SF2 includes mapping information that shows assignments for STAs with 80 MHz operational BWs (STA1, STA4, STA5, STAG, and STAT).

In an embodiment wherein each STA checks all the signaling field portions within the STA's operational BW (and incorporates the duplicates in order to enhance the success rate of the decoding of the associated signaling field portion), an Access Point (AP) may be flexible in how the mapping information is distributed within the signaling fields. For example, when stations participating in the communication include stations have 20 MHz, 40 MHz, 80 MHz operational BWs, the AP may determine whether to indicate resource assignments of a 40 MHz operational BW STA in a first signaling field transmitted in a primary 20 MHz channel, a second signaling field transmitted in a secondary 20 MHz channel, or both. The AP may determine whether to indicate resource assignment of a 80 MHz operational BW STA in one or more of the first signaling field transmitted in the primary 20 MHz channel, the second signaling field transmitted in the secondary 20 MHz channel, and a third signaling field transmitted in a secondary 40 MHz channel.

In an embodiment, the AP may distribute the mapping information among the signaling field portions of an OFDMA frame in order to minimize the number of symbols (that is, the amount of time) used to transmit the signaling fields, such as by distributing the mapping information as evenly as possible within the constraints imposed by the operational BW of each STA.

When a plurality of MAC Protocols Data Units (MPDUs) or Aggregated MPDUs (A-MPDUs) are communicated using an OFDMA frame to a STA having an operational BW of 40 MHz or 80 MHz, mapping information for different MPDUs or A-MPDUs may be communicated using different signaling fields.

For example, when the OFDMA frame includes first and second MPDUs destined for a station with an operational bandwidth of 40 MHz, mapping information for the first MPDU may be communicated using a first signaling field portion transmitted in a primary 20 MHz channel and mapping information for the second MPDU may be communicated using a second signaling field portion transmitted in a secondary 20 MHz channel. When the OFDMA frame includes first, second, and third MPDUs destined for a station with an operational bandwidth of 80 MHz, mapping information for the first MPDU may be communicated using a first signaling field portion transmitted in a primary 20 MHz channel, mapping information for the second MPDU may be communicated using a second signaling field portion transmitted in a secondary 20 MHz channel, and mapping information for the third MPDU may be communicated using a third signaling field portion transmitted in a secondary 40 MHz channel.

Figure 6:
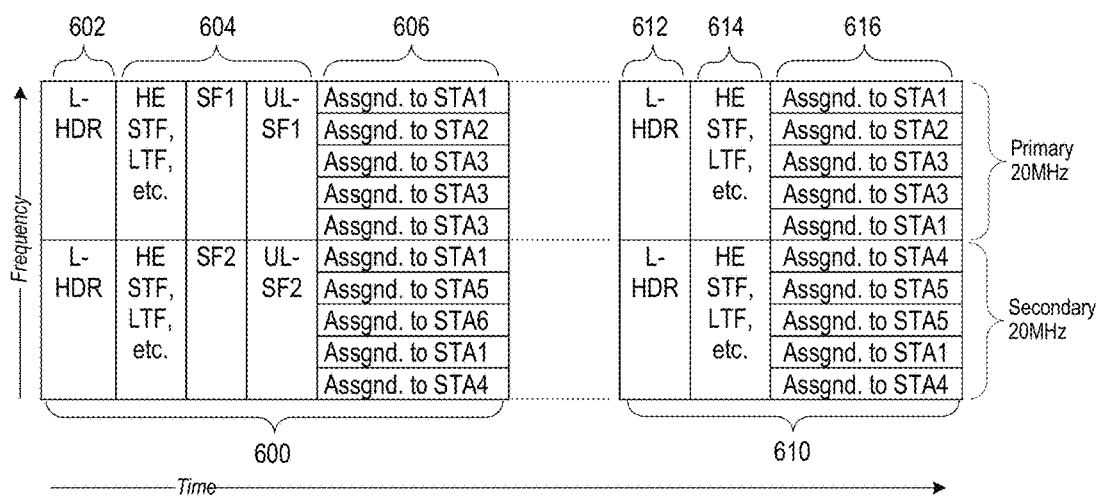
FIG. 6 illustrates communication of mapping information for an Up-Link (UL) OFDMA frame in a Down-Link (DL) OFDMA frame according to an embodiment.

FIG. 6 illustrates communication of mapping information for an Up-Link (UL) OFDMA frame 610 through a DL OFDMA frame 610. In the example of FIG. 6, each of the DL and UL OFDMA frames 600 and 610 have a total BW of 40 MHz, and each communicates with a plurality of STA wherein, during the time period of the communications, at least one STA has a 40 MHz operational BW and at least one other STA has a 20 MHz operational BW.

In the specific example of FIG. 6, STA2 and STA3 each have a 20 MHz operational BW during the communications of FIG. 6, and STA1, STA4, STA5, and STAG each have a 40 MHz operational BW.

The DL OFDMA frame 600 includes an L-HDR 602, similar to the L-HDRs of the frames of FIGS. 3-5. The DL OFDMA frame 600 further includes an HE-HDR 604 that includes HE-STF, HE-LTF, and first and second signaling field portions SF1 and SF2, each of which is similar to the corresponding components of the HE-HDRs of the frames of FIGS. 3-5.

The HE-HDR further includes first and second UL signaling field portions UL-SF1 and UL-SF2. The UL signaling field portions UL-SF1 and UL-SF2 include information related to the UL OFDMA frame 610.

The first and second signaling field portions SF1 and SF2 and first and second UL signaling field portions UL-SF1 and UL-SF2 are each transmitted using a 20 MHz bandwidth and include error detection and/or error correction information. First signaling field portion SF1 and first UL signaling field portion UL-SF1 are transmitted in a primary 20 MHz channel of the DL OFDMA frame 600. Second signaling field portion SF2 and second UL signaling field portion UL-SF2 are transmitted in a secondary 20 MHz channel of the DL OFDMA frame 600.

DL mapping information for a multi-access portion 606 (that is, the DL payload portion) of the DL OFDMA frame 600 is communicated using the first and second signaling field portions SF1 and SF2. In the example shown, the first signaling field portion SF1 may include all of DL mapping information for STA2 and STA3 (which have the 20 MHz operation BW), and may also include some or all of DL mapping information for one or more of STA1, STA4, STA5, and STA6 (which have the 40 MHz operation BW). The second signaling field portion SF2 may include DL mapping information for STA1, STA4, STA5, and STA6.

UL mapping information for a multi-access portion 616 of the UL OFDMA frame 610 is communicated using the first and second UL signaling field portions UL-SF1 and UL-SF2. In the example shown, the first UL signaling field portion UL-SF1 may include all of UL mapping information for STA2 and STA3 (which have the 20 MHz operation BW), and may also include some or all of UL mapping information for one or more of STA1, STA4, and STA5 (which have the 40 MHz operation BW). The second signaling field portion SF2 may include the UL mapping information for STA1, STA4, and STA5.

Note that not all the STAs that have a DL payload in multi-access portion 606 would necessarily have an UL payload in multi-access portion 616, hence the set of the STAs that are addressed in the signaling field portions SF1 and SF2 may be different than the set of the STAs that are addressed in the UL signaling field portions UL-SF1 and UL-SF2. In the example shown, STA6 participates in the DL communication of DL OFDMA frame 600 but does not participate in the UL communication of UL OFDMA frame 610. Also, a STA that has no payload in the DL OFDMA frame 600 may participate in the UL communication of UL OFDMA frame 610 (if the AP allocates an UL transmission opportunity to the STA in the UL signaling field portions UL-SF1 and/or UL-SF2.)

Although FIG. 6 shows separate signaling field portions for the UL and DL mapping information, embodiments are not limited thereto. In another embodiment, the mapping information communicated in the first signaling field portion SF1 and the first UL signaling field portion UL-SF1 are instead communicated in a single first combined signaling field portion using the primary 20 MHz channel, and the mapping information communicated in the second signaling field portion SF2 and the second UL signaling field portion UL-SF2 are instead communicated in a single second combined signaling field portion using the secondary 20 MHz channel. The mapping information would include indications of the OFDMA frame to which each assignment of resources applied.

In another embodiment, UL mapping information for an UL OFDMA frame may be communicated using a non-OFDMA frame. For example, the UL mapping information may be included in a legacy OFDM frame having a 20 MHz operational BW, so that all the pertinent STAs are able to decode the UL mapping information for the upcoming UL OFDMA frame. Such a legacy OFDM frame could be in a broadcast format, or it could be in multicast format. The STAs that are expected to participate in the communication using the UL OFDMA frame may be indicated using a group-addressing technique, such as the Group ID (GID) mechanisms of IEEE 802.11ac. In another embodiment, the UL mapping information may be included in a legacy OFDM frame having a greater than 20 MHz operational BW.

In another embodiment, not all portions in the DL frame 600 may be present. For instance, the DL signaling portions SF1 and SF2 in the HE-HDR 604 and the DL payload portion 606 may not be present. In such embodiment, the DL frame 600 carries the signaling portions UL-SF1 and UL-SF2 for the immediately subsequent UL frame and acts as a triggering frame for the immediately subsequent UL frame.

In other embodiments, some signaling portions in the HE-HDR 604 may be present and some other may not. For instance, the SF1 and UL-SF1 in 604 may be present but one or both of SF2 and UL-SF2 may not be present. When both SF2 and UL-SF2 are not present, it would indicate that all the receiving STAs are capable of processing and decoding SF1 and UL-SF1.

FIG. 6 and the signaling portions for the DL and UL mapped frames 600 and 610 demonstrate a cascaded DL and UL frames that an AP might perform once, or multiple times during a TXOP. In some embodiments, the DL signaling portion such as DL signaling field portions SF1 or SF2 may be associated to a set of STAs or all the STAs (all the STAs that are associated to the AP), in which case the set of STAs process the associated payload in the mapped multi-access portion 606 accordingly.

In some embodiments, the mapped multi-access portion 606 may include signaling information for the immediately subsequent UL frame, where in such cases the DL payloads act as UL signaling portions. As an example of above embodiments, some content of the DL signaling field portion SF1 may be associated to a set of STAs, where the STAs belonging to the set process and retrieve the indicated DL payload in the mapped multi-access portion 606, which may include signaling information for the set of STAs to participate in the immediately subsequent UL frame. As an another instance, an AP may perform the previous example multiple times during a TXOP, as a cascaded operation, and the set of STAs that are identified in one DL frame may not be the same as the set of STAs in the next DL frame.

Although the examples of FIG. 3-6 illustrate the distribution of STA-specific mapping information, embodiments are not limited thereto. A person of ordinary skill in the art in light of the teachings and disclosures herein would recognize that instead of mapping information, a plurality of information respectively destined for a plurality of STAs having different operational BWs may be distributed using a plurality of signaling field portions each in a different 20 MHz channel of an OFDMA frame in the manner described for the mapping information discussed in the examples of FIG. 3-6. In an embodiment, the plurality of signaling field portions includes a plurality of portions of an HE Signal B (HE SIG-B) field.

FIG. 7 illustrates a process 700 for communicating mapping information using portions of a signaling field according to an embodiment. The process 700 may be performed by an AP, such as the AP of BSS 100 of FIG. 1. In an embodiment, the process 700 is performed by a MAC processor such as the MAC processor 212 of FIG. 2.

In the example of FIG. 7, a BSS includes STAs having 20 MHz, 40 MHz, and 80 MHz operational bandwidths and communicates mapping information to the STAs using a single frame having a bandwidth of 80 MHz, but embodiments are not limited thereto. In an embodiment, the frame is a DL OFDMA frame.

At S702, the AP determines a mapping of frame resources to STAs. Only resources in a first 20 MHz channel are mapped to STAs with a 20 MHz operational bandwidth (20 MHz STAs), that is, all resource mappings for the 20 MHz STAs are for resources in the first channel. Only resources in the first channel and a second 20 MHz channel are mapped to the 40 MHz STAs, that is, all resource mappings for the 40 MHz STAs are for resources in either the first or second channel, or both. Any resources may be mapped to 80 MHz STAs.

At S704, resource mappings for the 20 MHz STAs are disposed within a first frequency portion of a signaling field, for example, the first signaling field portion SF1 in the primary 20 MHz channel of frame 400 of FIG. 4.

At S706, resource mappings for the 40 MHz STAs are disposed within either the first frequency portion or a second frequency portion of the signaling field. For example, the second frequency portion may be the second signaling field portion SF2 in the secondary 20 MHz channel of frame 400 of FIG. 4. In an embodiment, the second frequency portion does not include any resource mappings for the 20 MHz STAs.

In an embodiment, resource mappings for the 40 MHz STAs, may also be disposed within the first frequency portion. In an embodiment, resource mappings for the 40 MHz STAs that have been disposed within the first frequency portion are not disposed within the second frequency portion.

At S708, resource mappings for the 80 MHz STAs are disposed within either a third or fourth frequency portion of the signaling field. For example, the third frequency portion may be the third signaling field portion SF3 in the secondary 40 MHz channel of frame 400 of FIG. 4. In an embodiment, the third and fourth frequency portions do not include any resource mappings for the 20 MHz STAs or the 40 MHz STAs.

In an embodiment, resource mappings for the 80 MHz STAs, may also be disposed within the first or second frequency portion. In an embodiment, resource mappings for the 80 MHz STAs that have been disposed within the first or second frequency portion are not disposed within the third and fourth frequency portions.

At S710, the first to fourth portions of the signaling field are transmitted using first to fourth channels of a medium, respectively. Transmitting the first to fourth portions may include simultaneously transmitting symbols, such as OFDM symbols, generated using the first to fourth portions in each of the first to fourth channels, respectively, using one or more radio frequency (RF) transmitters electrically coupled to the medium.

Transmitting each portion may also include encoding each portion according to a bandwidth of the respective channel. In an embodiment, the bandwidth of the channel is 20 MHz.

In an embodiment, the first to fourth portions of the signaling field may be transmitted in a frame that includes the frame resources mapped by the signaling field (a mapped frame). In an embodiment, the first to fourth portions of the signaling field may be transmitted in a frame that is transmitted before the mapped frame. Particularly, in a UL OFDMA case wherein an UL OFDMA frame is the mapped frame, an AP transmits some or all of the first to fourth portions of the signaling field in a frame that is transmitted before the mapped frame.

FIG. 8 illustrates a process 800 of determining mapping information using portions of a signaling field. The process 800 may be performed by a STA such as any of the STAs of the BSS 100 of FIG. 1. In an embodiment, the process 800 is performed by a MAC processor such as the MAC processor 212 of FIG. 2.

At S802, the STA receives a current frame, or a portion thereof. When the STA is a 20 MHz STA (that is, a STA currently having a 20 MHz operational bandwidth), the STA may only receive a portion of the frame communicated in a first 20 MHz channel (such as a primary 20 MHz channel) even though the frame is transmitted with a 40 MHz, 80 MHz, or 160 MHz bandwidth. When the STA is a 40 MHz STA (that is, a STA currently having a 40 MHz operational bandwidth), the STA may only receive a portion of the frame communicated in a first 40 MHz channel (such as a primary 40 MHz channel).

The current frame includes a signaling field that may be communicated using a plurality of channels. The signaling field includes mapping information.

The mapping information may indicate an allocation of resources in a mapped frame. The mapped frame may be the current frame or may be a future frame that will be transmitted after the current frame.

At S804, the STA determines whether the STA is scheduled to participate in the communication that uses the mapped frame, by comparing an identifier of the STA (such as an association identifier, a partial association identifier, or a group identifier) with the set of stations identifiers or group of station identifiers that are carried in the mapping information. A person of ordinary skill in the art in light of the teachings and disclosure herein would be aware of signals and processes for determining whether the STA participates in the communication that uses the mapped frame. When the STA is not a participant in the communication, the STA exits the process 800. Note that in some embodiments, S804 might be part of the operations that are performed in S806, S810, and/or S814.

At S806, the STA checks a first portion of the signaling field for mapping information pertinent to the STA; that is, for mapping information that maps a resource of the mapped frame to the STA. The first portion of the signaling field is a portion communicated using a first 20 MHz channel (such as a primary 20 MHz channel).

If there is pertinent mapping information in the first portion of the signaling field, the STA sets a value of stored mapping information according to the pertinent mapping information. If there is no pertinent mapping information in the first portion of the signaling field, the STA clears the value of the stored mapping information.

At S808, the STA determines whether the STA is a 20 MHz STA. When the STA is a 20 MHz STA, the first portion of the signaling field may be the only portion of the signaling field that the STA received. Accordingly, when the STA is a 20 MHz STA, the STA proceeds to S816. In an embodiment, the STA may proceed to S816 when there is pertinent mapping information in the first portion, regardless of the operational BW of the STA.

At S810, the STA checks a second portion of the signaling field for mapping information pertinent to the STA. The second portion of the signaling field is a portion communicated using a second 20 MHz channel (such as a secondary 20 MHz channel).

If there is pertinent mapping information in the second portion of the signaling field, the STA augments the value of the stored mapping information according to the pertinent mapping information in the second portion.

At S812, the STA determines whether the STA is a 40 MHz STA. When the STA is a 40 MHz STA, the first and second portions of the signaling field may be the only portions of the signaling field that the STA received. Accordingly, when the STA is a 40 MHz STA, the STA proceeds to S816. In an embodiment, the STA may proceed to S816 when there is pertinent mapping information in the second portion, regardless of the operational BW of the STA.

At S814, the STA checks a third portion of the signaling field for mapping information pertinent to the STA. The third portion of the signaling field is a portion communicated using a first 20 MHz sub-channel of a 40 MHz channel (such as a secondary 40 MHz channel) that does not include either of the first or second 20 MHz channels.

In an embodiment, the STA also checks a fourth portion of the signaling field for mapping information pertinent to the STA. The fourth portion of the signaling field is a portion communicated using a second 20 MHz sub-channel of the 40 MHz channel (such as the secondary 40 MHz channel) that does not include the either of the first or second 20 MHz channels.

In some embodiments, each portion that is referred to in S806, S810 and S814 might be composed of two units, where the second unit is a copy of the first unit, and a STA processing each portion may first combine the two units or jointly process the two units in order to increase the decoding success rate of the portion. In another embodiment, the fourth portion of the signaling field includes information having a polynomial relationship to one or more of the first to third portions of the signaling field, and the STA detects (and in an embodiment corrects) errors in the first to third portions of the signaling field using the fourth portion of the signaling field.

If there is pertinent mapping information in the third and/or fourth portions of the signaling field, the STA augments the value of the stored mapping information according to the pertinent mapping information in the third and/or fourth portions.

At S816, the STA determines which resources are mapped to the STA in the mapped frame using the stored mapping information.

Figure 9:
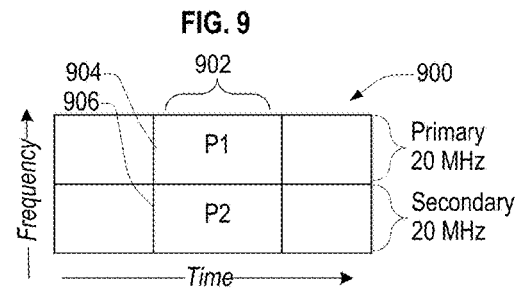
FIG. 9 illustrates a frame having a 40 MHz bandwidth according to an embodiment.

FIG. 9 illustrates a frame 900 having a 40 MHz bandwidth and a signaling field 902 transmitted across the entire bandwidth of the frame 900 according to an embodiment. First and second portions P1 and P2 of the signaling field 902 are respectively encoded according to a 20 MHz bandwidth, and contents of the first portion P1 may be different from contents of the second portion P2. The first portion P1 may be transmitted using one or more symbols 904 of a first 20 MHz sub-channel, such as a primary 20 MHz sub-channel, and the second portion P2 may be transmitted using one or more symbols 906 of a second 20 MHz sub-channel.

Figure 10:
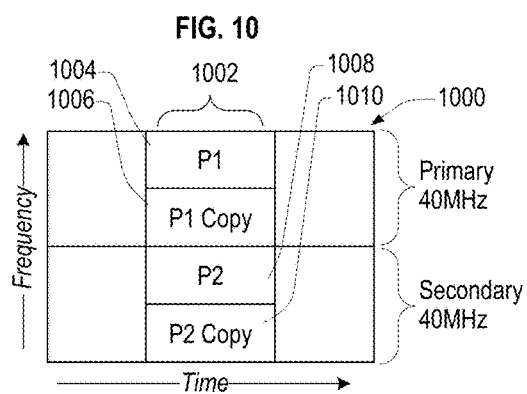
FIG. 10 illustrates a frame having an 80 MHz bandwidth according to an embodiment.

FIG. 10 illustrates a frame 1000 having a 80 MHz bandwidth and a signaling field 1002 transmitted across the entire bandwidth of the frame 1000 according to an embodiment. First and second portions P1 and P2 of the signaling field 1002 are respectively encoded according to a 20 MHz bandwidth, and contents of the first portion P1 may be different from contents of the second portion P2. The first portion P1 may be transmitted using one or more symbols 1004 of a first 20 MHz sub-channel of a first 40 MHz channel, and a copy of the first portion P1 may be transmitted using one or more symbols 1006 of a second 20 MHz sub-channel of the first 40 MHz channel. The second portion P2 may be transmitted using one or more symbols 1008 of a first 20 MHz sub-channel of a second 40 MHz channel, and a copy of the second portion P2 may be transmitted using one or more symbols 1010 of a second 20 MHz sub-channel of the second 40 MHz channel.

Figure 11:
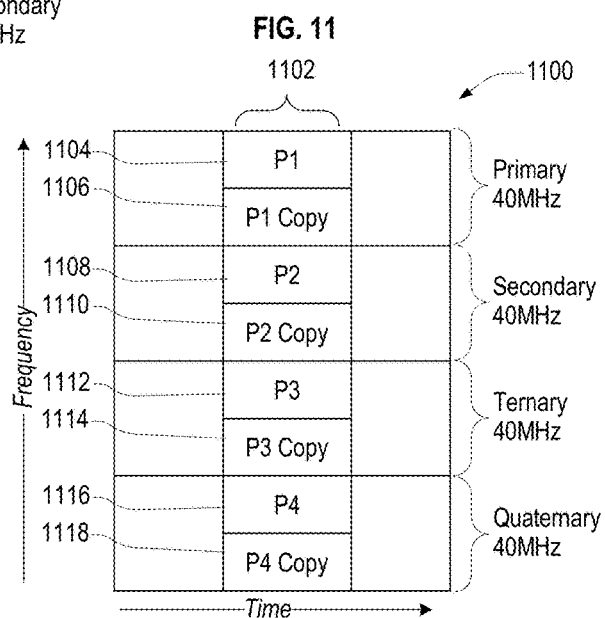
FIG. 11 illustrates a frame having a 160 MHz bandwidth (or an 80+80 MHz bandwidth) according to an embodiment.

FIG. 11 illustrates a frame 1100 having a 160 MHz bandwidth (or an 80+80 MHz bandwidth) and a signaling field 1102 transmitted across the entire bandwidth of the frame 1100 according to an embodiment. First, second, third, and fourth portions P1, P2, P3, and P4 of the signaling field 802 are respectively encoded according to a 20 MHz bandwidth, and contents of each of the first to fourth portions P1 to P4 may be different from each other. The first, second, third, and fourth portions P1, P2, P3, and P4 may be respectively transmitted using one or more symbols 1104, 1108, 1112, and 1116 of a first sub-channel of primary, secondary, ternary, and quaternary 40 MHz channels of the frame 1100. Copies of the first, second, third, and fourth portions P1, P2, P3, and P4 may be respectively transmitted using one or more symbols 1106, 1110, 1114, and 1118 of a second sub-channel of the primary, secondary, ternary, and quaternary 40 MHz channels of the frame 1100.

Figure 12:
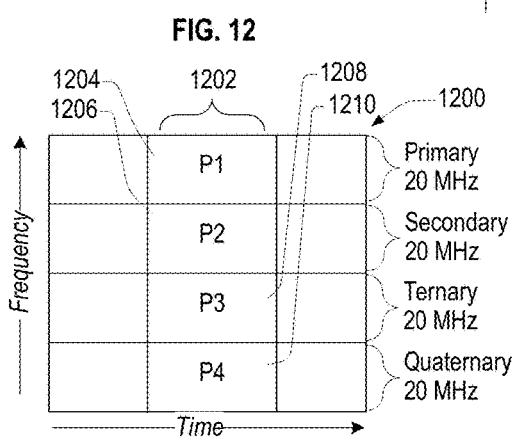
FIG. 12 illustrates a frame having an 80 MHz bandwidth according to an embodiment.

In an embodiment, there is a polynomial dependency between all the 20 MHz portions of the signaling field. FIG. 12 illustrates a frame 1200 having an 80 MHz bandwidth and a signaling field 1202 transmitted across the entire bandwidth of the frame 1200 according to an embodiment. First, second, and third portions P1, P2, and P3 of the signaling field 1202 are respectively encoded according to a 20 MHz bandwidth, and contents of each of the first to third portions P1 to P3 may be different from each other. The first, second, third, and fourth portions P1, P2, and P3 may be respectively transmitted using one or more symbols 1204, 1206, and 1208 of primary, secondary, and ternary 20 MHz channels of the frame 1200.

A fourth portion P4 of the signaling field 1202 is encoded according to a 20 MHz bandwidth and transmitted using one or more symbols 1210 of a quaternary 20 MHz channel of the frame 1200. Contents of the fourth portion P1 have a polynomial relationship to contents of one or more of the first, second, and third portions P1, P2, and P3. The polynomial may be a polynomial known in the art with good parity properties, such as a polynomial used in the art for error correction and/or error detection, or it might be a repetition error correction code where the content of P4 is duplicated from one of the portions P1, P2 or P3.

For example, in an embodiment, the contents of a fourth portion P4 of the signaling field 1202 may be equal to a bit-wise exclusive-or of the contents of the first, second, and third portions P1, P2, and P3 of the signaling field 1202. In another illustrative embodiment, corresponding octets in the first, second, and third portions P1, P2, and P3 may be used to generate a forward error correcting code, such as a polynomial block code, as the contents of a corresponding octet in the fourth portion P4.

Similarly, in a frame having an operational BW of 160 MHz or 80+80 MHz, the content of M>1 out of eight 20 MHz portions of a signaling field are different and the content of the remaining 8-M 20 MHz portion has a polynomial relationship with the first M portions.

In some designs, a prior field (for example, an HE SIG-A field) includes an indication of which of above designs of the signaling field is applied to the current frame. This indication may be denoted as "Name-Duplication," wherein "name" is a name of the signaling field. For example, in an embodiment wherein the signaling field is an HE SIG-B field, the indication may be denoted "SIGB-Duplication."

In some embodiments, the Name-Duplication indication may be a single-bit sub-field where when it is set to FALSE value it indicates that the signaling field is encoded across the full bandwidth of the frame as described above, and when it is set to TRUE value it indicates that the signaling field is encoded across each 20 MHz sub-channel and duplicated across some or all other 20 MHz sub-channels according to a pattern (that is a priori known to the AP and other STAs), similar to the patterns described above.

In some embodiments, the Name-Duplication indication is a multi-bit sub-field where when it is set to zero value it indicates that the signaling field is encoded across the full bandwidth of the frame as described above, and when it is set to a non-zero value it indicates that the signaling field is encoded across a 20 MHz sub-channel and duplicated across some or all other 20 MHz sub-channels according to a pattern (that is a priori known to the AP and other STAs). The Name-Duplication sub-field may have a reserved value for 20 MHz frames. The AP determines which signaling field structure to use based on its collective evaluation of the activity within its BSS and accordingly sets the value of Name-Duplication.

A STA that is associated with an AP supporting multiple choices of signaling field structure may first decode the prior field and then would locate, among all sub-fields within the prior field, the Name-Duplication sub-field and a length sub-field corresponding to a length of the signaling field. The STA determines how to decode the signaling field according to values of the Name-Duplication sub-field and the length sub-field.

If the value of the Name-Duplication sub-field is FALSE or zero, then the STA decodes the signaling field across the full bandwidth of the frame. If the value of the Name-Duplication sub-field is TRUE or other non-zero values, then the STA decodes each 20 MHz portion of the signaling field and then combines one or more of the 20 MHz decoded portions according to the a priori duplication structure of the signaling field.

In some embodiment, if the value of the Name-Duplication sub-field is TRUE or another non-zero value, the STA processes each 20 MHz portion of the signaling field first— but not fully-decoded to pre-Forward-Error-Coding (pre-FEC) content—and then according to the repetition or polynomial structure of the signaling field (as is a priori known to the AP and all the associated STAs) combines some of the 20 MHz decoded portions to determine the contents of signaling field.

In one embodiment, for a frame having a 40 MHz bandwidth, the content of the Name-Duplication sub-field is a reserved value.

In another embodiment, for a frame with a 40 MHz bandwidth, the Name-Duplication sub-field being set to FALSE indicates that the signaling field is encoded in one part over the entire 40 MHz bandwidth. The Name-Duplication sub-field being set to TRUE indicates that the signaling field is encoded in two parts, where the first part is communicated using a primary 20 MHz sub-channel and the second part is communicated using a secondary 20 MHz sub-channel, and the content of the first and second parts are identical. In another embodiment, when the Name-Duplication sub-field is set to TRUE the structure of the signaling field is the same as described above, but the content of the first and second parts are not identical.

In an embodiment, for a frame with an 80 MHz bandwidth, the Name-Duplication sub-field being set to FALSE indicates that the signaling field is encoded in two parts where the one part is encoded across a primary 40 MHz channel and the other part is encoded across a secondary 40 MHz channel, and the content of the two parts are not identical. The Name-Duplication sub-field being set to TRUE indicates that the signaling field is encoded in four parts, each part over a 20 MHz channel, and that the content of the first and third portions are the same and the content of the second and fourth portions are the same.

In one embodiment, for a frame with a 160 MHz or an 80±80 MHz bandwidth, the Name-Duplication sub-field being set to FALSE indicates that the signaling field is encoded in four parts, wherein one part is encoded across the primary 40 MHz channel and the another part is encoded across secondary 40 MHz channel and the content of these two parts are not identical. Then the content of the first part of the signaling field is duplicated on the third 40 MHz sub-channel (hence the content of the part of the signaling field for the primary 40 MHz sub-channel and the third 40 MHz sub-channel are the same) and the content of the second part of the signaling field is duplicated on the fourth 40 MHz sub-channel (hence the content of the part of the signaling field for the secondary 40 MHz sub-channel and the fourth 40 MHz sub-channel are the same). The Name-Duplication sub-field being set to TRUE indicates that the signaling field is encoded in eight parts, each part over a 20 MHz sub-channel where the content of the first, third, fifth, seventh portions are the same and the content of the second, fourth, sixth, and eighth portions are the same.

When a STA receives a frame having a Name-Duplication sub-field present in an HE SIG-A field, the STA first decodes the HE SIG-A field and obtains the value of the Name-Duplication sub-field. The STA then parses and decodes the content of the signaling field according to the value of the Name-Duplication sub-field (and depending on the embodiments described above).

In an embodiment, a Name-Duplication sub-field may be included in an information element (IE) of a Beacon frame, The Name-Duplication sub-field in the Beacon frame indicates a structure of signaling field encoding (as described herein) for the following Beacon interval. In an embodiment, the Name-Duplication sub-field may instead appear within an IE of an Association Response frame and indicates the structure of signaling field encoding (as described herein) until a next Re-association Response frame.

In an embodiment, a STA obtains a value of a Name-Duplication sub-field from each Beacon frame received by the STA and uses that value to parse and decode the content of the signaling field for all frames including the signaling field (for example, all of a class of HE frames) received until the next Beacon frame, according to an embodiment described above.

In the embodiments where the content of the Name-Duplication sub-field is carried in Association Response or Re-association Response frames, a STA would use a value of the Name-Duplication sub-field to parse and decode the content of the applicable signaling field in all applicable frames that include the signaling field. In an embodiment, the applicable frames include all HE frames (for example, IEEE 802.11ax frames) received until the next Association Response or Re-association Response frames, and according to the embodiments herein.

In an embodiment, when a frame has a bandwidth of 80, 160, or 80+80 MHz, the signaling field is encoded across each 40 MHz sub-channel and duplicated across each 40 MHz sub-channel. In an embodiments, when a frame has a bandwidth of 80, 160, or 80+80 MHz, the signaling field is encoded across each 40 MHz sub-channel but the content of each 40 MHz portion of the signaling field is different across each 40 MHz sub-channel. The same design principle described above with respect to 20 MHz portions is applied, but on 40 MHz portions.

In above explanations and figures, illustrative embodiments were provided to allow a person of skill in the art to understand and implement embodiments of the disclosure. However, embodiments are not limited thereto, and are therefore not limited to the number of STAs, specific identifications, specific formats, specific number of STAs per identifications, or other specifics of the illustrative embodiments. Furthermore, while in the description and related figures the reference has made to one or more IEEE Std 802.11 standards, embodiments are not limited thereto, and a person of skill in the art in light of the teachings and disclosures herein would understand how the present disclosures apply to any wireless operation that operates in licensed or unlicensed bands.

Embodiments of the present disclosure include electronic devices configured to perform one or more of the operations described herein. However, embodiments are not limited thereto.

Embodiments of the present disclosure may further include systems configured to operate using the processes described herein. The systems may include basic service sets (BSSs) such as the BSS 100 of FIG. 1, but embodiments are not limited thereto.

Embodiments of the present disclosure may be implemented in the form of program instructions executable through various computer means, such as a processor or microcontroller, and recorded in a non-transitory computer-readable medium. The non-transitory computer-readable medium may include one or more of program instructions, data files, data structures, and the like. The program instructions may be adapted to execute the processes and to generate and decode the frames described herein when executed on a device such as the wireless devices shown in FIG. 1.

In an embodiment, the non-transitory computer-readable medium may include a read only memory (ROM), a random access memory (RAM), or a flash memory. In an embodiment, the non-transitory computer-readable medium may include a magnetic, optical, or magneto-optical disc such as a hard disk drive, a floppy disc, a CD-ROM, and the like.

While this invention has been described in connection with what is presently considered to be practical embodiments, embodiments are not limited to the disclosed embodiments, but, on the contrary, may include various modifications and equivalent arrangements included within the spirit and scope of the appended claims. The order of operations described in a process is illustrative and some operations may be re-ordered. Further, two or more embodiments may be combined.

What is claimed is:

1. A method for communicating a signaling field in a wireless communications system, the method comprising:
   transmitting, by a wireless device, a frame through a medium using an 80 MHz bandwidth, wherein transmitting the frame includes:
   transmitting a first portion of a signaling field in the frame using a first channel having a 20 MHz bandwidth;
   transmitting a second portion of the signaling field in the frame using a second channel having a 20 MHz bandwidth,
   transmitting a third portion of the signaling field in the frame using a third channel having a 20 MHz bandwidth, and
   transmitting a fourth portion of the signaling field in the frame using a fourth channel having a 20 MHz bandwidth,
   wherein the second channel is different from the first channel, the third channel is different from the first and second channels, and the fourth channel is different from the first, second, and third channels, and wherein contents of the first portion are different from contents of the second portion, contents of the third portion are the same as the contents of the first portion, and contents of the fourth portion are the same as the contents of the second portion.

2. The method of claim 1, wherein the signaling field is one of (1) a High Efficiency (HE) Signal-B (SIG-B) field and (2) one or more payload fields of a downlink frame that triggers immediate subsequent uplink communications.

3. The method of claim 1, further including:
determining, by the wireless device, a plurality of assignments of resources of a mapped frame to respective stations of a plurality of stations;
determining, by the wireless device, respective operational bandwidths of the plurality of stations; and
incorporating, by the wireless device, the assignments into the contents of either the first or second portion according to the operational bandwidths of the respective stations.

4. The method of claim 3, wherein incorporating the assignments into the contents of either the first or second portions according to the operational bandwidths of the respective stations includes:
incorporating an assignment into the first portion when a respective station has an operational bandwidth equal to a bandwidth of the first channel; and
incorporating the assignment into the second portion when the respective station has the operational bandwidth equal to a sum of the bandwidth of the first channel and a bandwidth of the second channel.

5. The method of claim 4, further including:
incorporating the assignment into a third portion of the signaling field when the respective station has the operational bandwidth equal to or greater than a sum of the bandwidth of the first channel, the bandwidth of the second channel, and a bandwidth of a third channel; and
transmitting the third portion of the signaling field using the third channel,
wherein the third channel includes a third frequency different from the first and second frequencies.

6. The method of claim 4, wherein incorporating the assignments into the contents of either the first or second portions according to the operational bandwidths of the respective stations further includes incorporating the assignment into the first and second portions when the respective station has the operational bandwidth equal to the sum of the bandwidth of the first channel and the bandwidth of the second channel.

7. The method of claim 3, wherein the frame is the mapped frame.

8. The method of claim 3, wherein the frame precedes the mapped frame.

9. The method of claim 8, wherein the mapped frame is an Up-Link (UL) Orthogonal Multi-Frequency Multiple Access (OFDMA) frame.

10. The method of claim 1, further comprising:
transmitting, by the wireless device, a duplication indication,
wherein the contents of the first portion of the signaling field are equal to the contents of the second portion the signaling field when the duplication indication has a first value; and
wherein the contents of the first portion of the signaling field are different from the contents of the second portion the signaling field when the duplication indication has a second value.

11. The method of claim 10, wherein one or more of the frame, a Beacon frame transmitted by the wireless device, and an Association Response frame transmitted by the wireless device includes the duplication indication.

12. A method for communicating a signaling field in a wireless communications system, the method comprising:
receiving, by a wireless device, a frame through a medium using an 80 MHz bandwidth, wherein receiving the frame includes:
receiving a first portion of a signaling field in the frame using a first channel having a 20 MHz bandwidth;
receiving a second portion of the signaling field in the frame using a second channel having a 20 MHz bandwidth,
receiving a third portion of the signaling field in the frame using a third channel having a 20 MHz bandwidth, and
receiving a fourth portion of the signaling field in the frame using a fourth channel having a 20 MHz bandwidth;
processing, by a wireless device, first contents of the first channel of the frame received through the medium;
processing, by the wireless device, second contents of the second channel of the frame when an operational bandwidth of the wireless device is equal to or greater than a first bandwidth value;
determining contents of the signaling field according to the first contents when the operational bandwidth is less than the first bandwidth value; and
determining the contents of the signaling field according to the first and second contents when the operational bandwidth is equal to or greater than the first bandwidth value,
wherein the second channel is different from the first channel, the third channel is different from the first and second channels, and the fourth channel is different from the first, second and third channels, and
wherein contents of the first portion are different from contents of the second portion, contents of the third portion are the same as the contents of the first portion, and contents of the fourth portion are the same as the contents of the second portion.

13. The method of claim 12, wherein the signaling field includes mapping information of a mapped frame.

* * * * *